(12) United States Patent
Kneller et al.

(10) Patent No.: US 8,528,861 B2
(45) Date of Patent: Sep. 10, 2013

(54) ADJUSTABLE WIDTH SEATS

(75) Inventors: Heidi J. Kneller, Bellevue, WA (US);
Shawn A. Claflin, Seattle, WA (US);
Buddy L. Sharpe, Mill Creek, WA (US);
Mark Edward Wentland, Lynwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/462,644

(22) Filed: May 2, 2012

(65) Prior Publication Data
US 2012/0299346 A1    Nov. 29, 2012

Related U.S. Application Data

(62) Division of application No. 12/262,648, filed on Oct. 31, 2008, now Pat. No. 8,186,760.

(51) Int. Cl.
*B64D 13/00* (2006.01)

(52) U.S. Cl.
USPC ............... 244/118.6; 297/115; 297/411.32; 297/232

(58) Field of Classification Search
USPC ............... 297/115, 113, 117, 411.32, 232; 244/118.6, 118.5
See application file for complete search history.

(56) References Cited

U.S. PATENT DOCUMENTS

| | | | |
|---|---|---|---|
| 1,505,550 A | 8/1924 | Freedlander | |
| 1,732,116 A | 10/1929 | Boller | |
| 2,646,107 A | 7/1953 | Murphy | |
| 2,648,910 A | 8/1953 | Brown | |
| 3,374,032 A | 3/1968 | Del Giudice | |
| 3,612,606 A | 10/1971 | Swenson | |
| 3,893,729 A | 7/1975 | Sherman et al. | |
| 3,910,632 A | 10/1975 | Marechal | |
| 3,926,473 A | 12/1975 | Hogan | |
| 4,768,832 A | 9/1988 | Wain | |
| 5,037,157 A | 8/1991 | Wain et al. | |
| 5,104,065 A | 4/1992 | Daharsh et al. | |
| 5,284,379 A | 2/1994 | Arnold et al. | |
| 5,383,704 A | 1/1995 | Granados et al. | |
| 5,433,503 A | 7/1995 | De Filippo | |
| 5,516,194 A | 5/1996 | Maule | |
| 5,957,407 A | 9/1999 | Auestad | |
| 6,012,679 A | 1/2000 | Auestad | |
| 6,076,768 A | 6/2000 | Durand et al. | |

(Continued)

FOREIGN PATENT DOCUMENTS

| | | |
|---|---|---|
| JP | 58224818 | 12/1983 |
| JP | 05069771 | 3/2005 |
| WO | WO2010120811 | 10/2010 |

OTHER PUBLICATIONS

USPTO final office action dated Oct. 27, 2011 regarding U.S. Appl. No. 12/262,648, 14 pages.

(Continued)

*Primary Examiner* — David E Allred
(74) *Attorney, Agent, or Firm* — Yee & Associates, P.C.

(57) ABSTRACT

A seating system may comprise a first seat, a second seat, and a plurality of armrests. The plurality of armrests may be located between the first seat and the second seat. The plurality of armrests may be capable of being deployed to change a seating space for the first seat.

8 Claims, 9 Drawing Sheets

(56) References Cited

U.S. PATENT DOCUMENTS

| | | |
|---|---|---|
| 6,176,547 B1 | 1/2001 | François et al. |
| 6,793,282 B2 | 9/2004 | Plant et al. |
| 6,929,218 B1 | 8/2005 | Sanford et al. |
| 7,070,239 B1 | 7/2006 | Ugrekhelidze et al. |
| 7,137,594 B2 | 11/2006 | Mitchell et al. |
| 7,261,381 B2 | 8/2007 | Tsai |
| 7,567,186 B2 | 7/2009 | Endress et al. |
| 7,631,931 B2 | 12/2009 | Langensiepen |
| 7,878,586 B2 | 2/2011 | Kneller et al. |
| 7,975,962 B2 | 7/2011 | Jacob |
| 8,060,345 B2 | 11/2011 | Lee et al. |
| 8,070,233 B2 | 12/2011 | Schumacher et al. |
| 8,201,878 B2 * | 6/2012 | Maier et al. .................... 297/112 |
| 2006/0032979 A1 * | 2/2006 | Mitchell et al. ............ 244/118.6 |
| 2009/0008982 A1 * | 1/2009 | Langensiepen .......... 297/411.32 |
| 2009/0321565 A1 | 12/2009 | Barmichev et al. |
| 2010/0012780 A1 | 1/2010 | Kohlmeier-Beckmann et al. |
| 2010/0064590 A1 * | 3/2010 | Jones et al. ..................... 49/469 |
| 2010/0109400 A1 * | 5/2010 | Kneller et al. ............. 297/284.3 |
| 2010/0109413 A1 | 5/2010 | Kneller et al. |
| 2010/0148002 A1 | 6/2010 | Park et al. |
| 2010/0224727 A1 | 9/2010 | Bauer et al. |
| 2010/0252680 A1 * | 10/2010 | Porter ........................ 244/118.6 |
| 2010/0282902 A1 * | 11/2010 | Rajasingham ............. 244/118.6 |
| 2011/0260002 A1 | 10/2011 | Bamford et al. |
| 2012/0025571 A1 * | 2/2012 | Merensky ..................... 297/232 |

OTHER PUBLICATIONS

USPTO non-final office action dated May 6, 2011 regarding U.S. Appl. No. 12/262,648, 17 pages.

USPTO notice of allowance dated Jan. 25, 2012 regarding U.S. Appl. No. 12/262,648, 6 pages.

Response to final office action dated Dec. 30, 2011 regarding U.S. Appl. No. 12/262,648, 12 pages.

Response to office action dated Jul. 28, 2011 regarding U.S. Appl. No. 12/262,648, 21 pages.

* cited by examiner

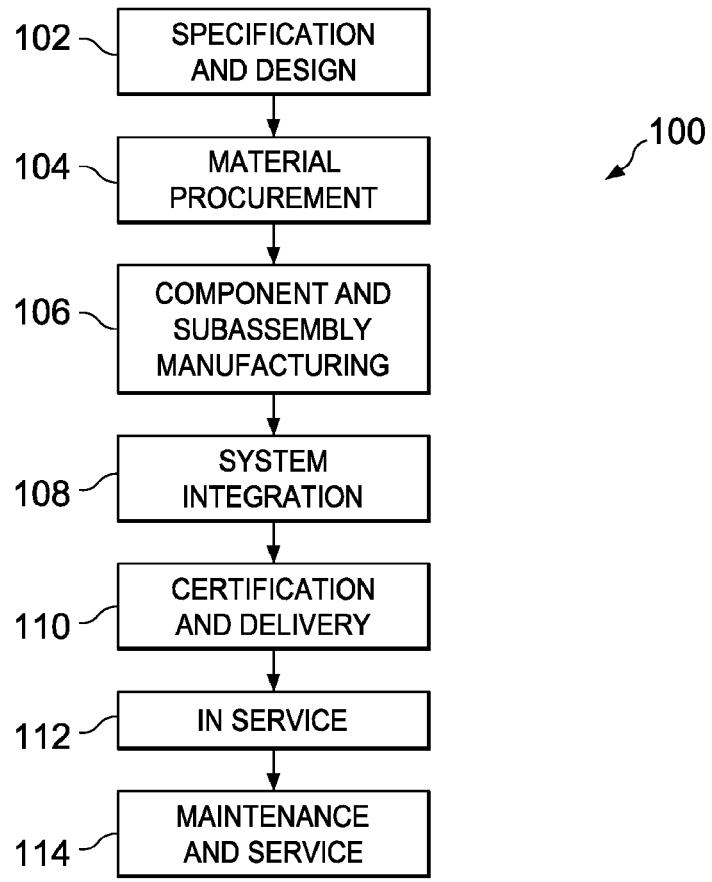
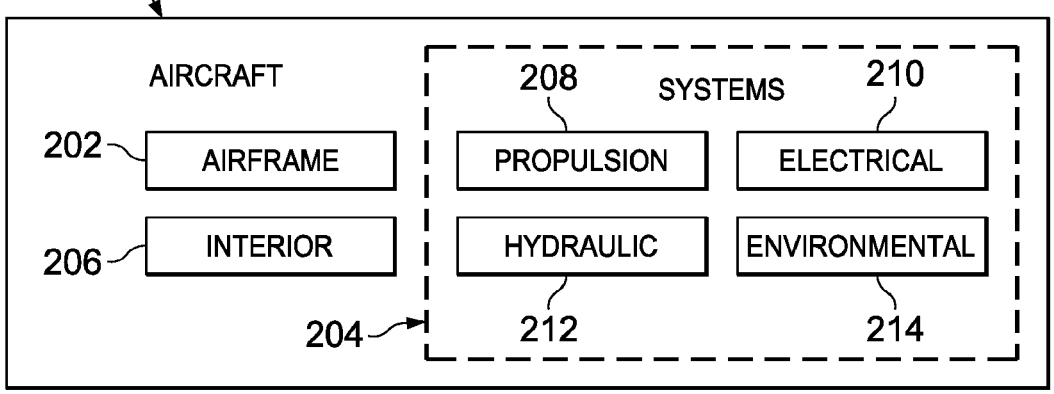

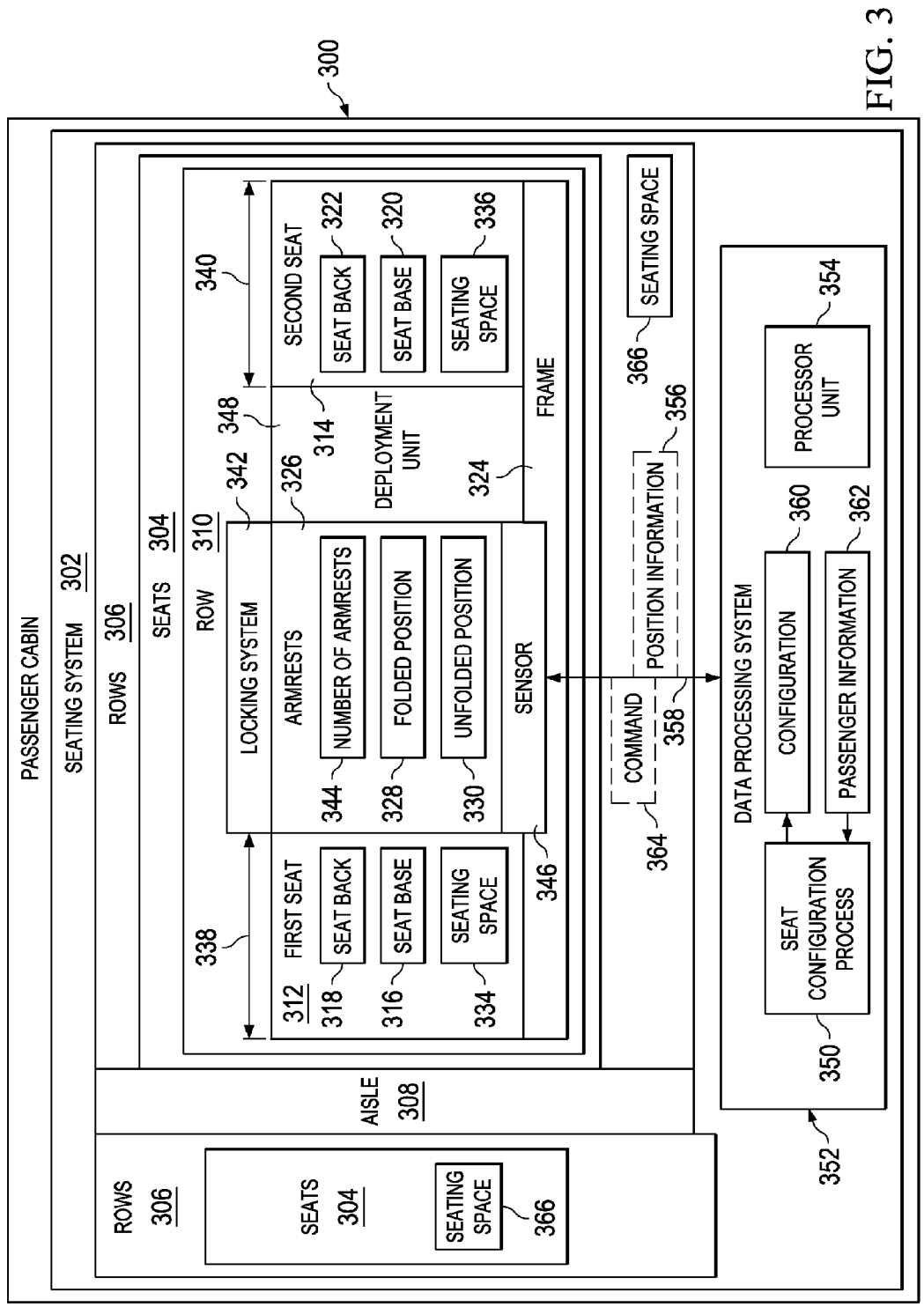

ADJUSTABLE WIDTH SEATS

The present application is a divisional application of U.S. application Ser. No. 12/262,648, filed Oct. 31, 2008, issued on May 29, 2012, U.S. Pat. No. 8,186,760.

BACKGROUND INFORMATION

1. Field

The present disclosure relates generally to aircraft and, in particular, to aircraft cabins. Still more particularly, the present disclosure relates to allocating seating space within a cabin of an aircraft.

2. Background

An aircraft cabin may be the portion of an aircraft in which passengers may occupy during flight. An aircraft cabin may also be referred to just as a cabin or a passenger cabin.

Seats within an aircraft cabin may typically be arranged in rows and aisles. In these examples, seats may be chairs in an aircraft to accommodate passengers during flight.

An aircraft may have different sections in which seats may provide different amounts of width or space for a passenger. For example, in higher-class travel, more space may be provided for individual seats. Seats may have more width in a first-class portion of a cabin as opposed to an economy-class portion of a cabin. Further, the pitch or distance between rows of seats also may be adjusted.

Seats may include various amenities. For example, without limitation, seats may recline, include lumbar support, have adjustable headrests, include electronics, and have other suitable features. One particular feature of interest to many passengers may be the width of a seat. The width of a seat may change in different travel classes.

Currently, seats may be readjusted to change widths and/or pitch. These types of adjustments, however, may require time and may take an aircraft out of service. For example, to change from seats of one width to another width, the existing seats may be removed from the aircraft. Then, the new seats may be placed in the aircraft. In adjusting the pitch of an aircraft, entire seat rows may be adjusted during maintenance and service.

These kinds of adjustments, however, may take an aircraft out of service for some period of time to make adjustments. These types of adjustments also may reduce revenues of an aircraft.

Therefore, it would be advantageous to have a method and apparatus to adjust seating within a cabin that addresses at least some of the issues described above.

SUMMARY

In view of one or more of the issues described above, the advantageous embodiments provide a method and apparatus to adjust seating within a cabin.

In one advantageous embodiment, a seating system may comprise a first seat, a second seat, and a plurality of armrests. The plurality of armrests may be located between the first seat and the second seat. The plurality of armrests may be capable of being deployed to change a seating space for the first seat.

In another advantageous embodiment, a seating system may comprise a first seat, a second seat, a plurality of armrests, an armrest, a locking system, a sensor, a data processing system, and a seat configuration process. The first seat may have a first side, a second side, a first seat base, and a first seat back. The first side of the first seat may be located at an end of a row. The second seat may have a second seat base and a second seat back. The plurality of armrests may be located between the first seat and the second seat. At least one armrest in the plurality of armrests may be capable of being deployed to change a seating space for the first seat and the second seat. The armrest may be located on the first side of the first seat. The locking system may be capable of selectively locking the plurality of armrests in a folded position. The sensor may be capable of generating a signal identifying a position of the plurality of armrests. The seat configuration process may be located on the data processing system and may be capable of identifying a seating space requirement for a passenger assigned to the first seat. The seat configuration process may be capable of selectively unlocking a number of armrests in the plurality of armrests based on the seating space requirement for the passenger.

In yet another advantageous embodiment, a method may be present for allocating seat space. A seating space requirement in a passenger cabin may be identified to form an identified seating space requirement. A number of armrests separating a first seat and a second seat may be deployed based on the identified seating space requirement.

In still yet another advantageous embodiment, a method may be present for allocating seat space. A seating space requirement may be identified for a passenger assigned to a first seat in a passenger cabin based on one of a size of the passenger and a class of service to form an identified seating space requirement. A number of armrests separating the first seat and the second seat may be deployed based on the identified seating space requirement by unlocking the number of armrests separating the first seat and the second seat based on the identified seating space requirement and moving the number of armrests into an unfolded position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is a diagram illustrating an aircraft manufacturing and service method in accordance with an advantageous embodiment;

FIG. 2 is a diagram of an aircraft in which an advantageous embodiment may be implemented;

FIG. 3 is a diagram of a passenger cabin in accordance with an advantageous embodiment;

DETAILED DESCRIPTION

Figure 4:
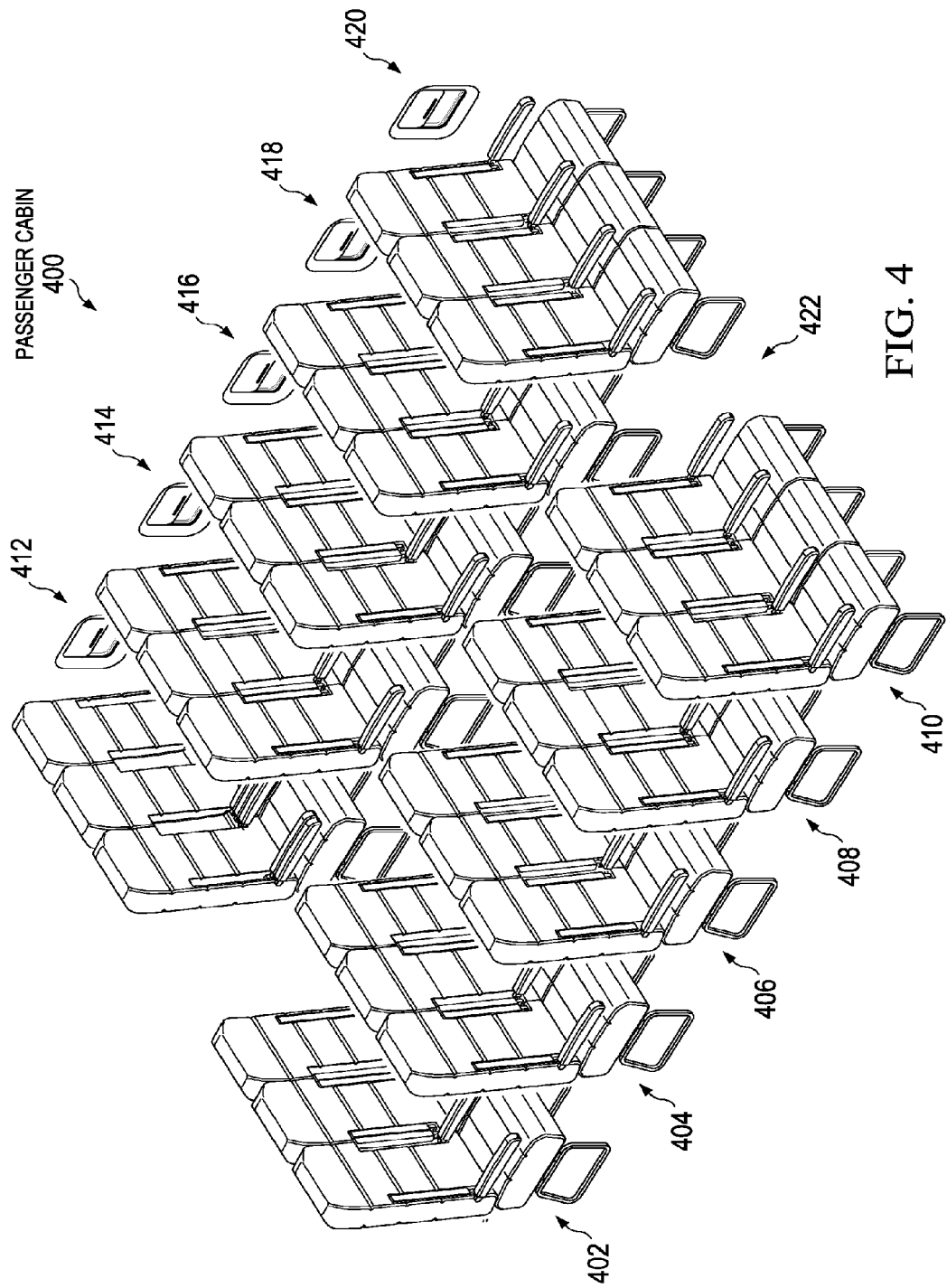
FIG. 4 is a diagram illustrating a passenger cabin in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As one example, different advantageous embodiments may be implemented during component and subassembly manufacturing 106 and system integration 108 to install seats that may provide adjustable width. Further, the different advantageous embodiments may be utilized while in service 112 to reconfigure widths for adjustable width seats. This type of adjustment may not require the aircraft to be scheduled for maintenance and service 114.

The different advantageous embodiments provide a method and apparatus for allocating seating space within a passenger cabin. The different advantageous embodiments may be performed without taking an aircraft out of service for maintenance to change seating space within the passenger cabin. The different advantageous embodiments may provide a seating system that may have a first seat and a second seat. A plurality of armrests may be located between the first seat and the second seat. The plurality of armrests may be capable of being deployed to change a seating space for the first seat and/or second seat.

With reference now to FIG. 3, a diagram of a passenger cabin is depicted in accordance with an advantageous embodiment. Passenger cabin 300 is an example of a passenger cabin that may be implemented in interior 206 of aircraft 200 in FIG. 2. Passenger cabin 300 may have seating system 302. Seating system 302 may have seats 304 arranged in rows 306 around aisle 308. Aisle 308 may be any type of aisle within passenger cabin 300. For example, aisle 308 may be a center aisle or an aisle running parallel to another aisle within cabin 300.

Row 310 may be an example of a row within rows 306. In this illustrative example, row 310 may include first seat 312 and second seat 314. First seat 312 may be located by second seat 314 in these examples. First seat 312 may have seat base 316 and seat back 318. Second seat 314 may have seat base 320 and seat back 322. First seat 312 and second seat 314 may be supported by frame 324. Armrests 326 may be located between first seat 312 and second seat 314.

In the different advantageous embodiments, armrests 326 may be moved between folded position 328 and unfolded position 330. Depending on which armrest or armrests within armrests 326 are in folded position 328 and/or unfolded position 330, seating space 334 for first seat 312 and/or seating space 336 for second seat 314 may be changed. In these examples, the change in seating space 334 and/or seating space 336 may be width 338 of first seat 312 and/or width 340 of second seat 314. Armrests 326 may be two or more armrests in these examples.

Locking system 342 may prevent number of armrests 344 from being moved between folded position 328 and unfolded position 330. A number as used herein refers to one or more items. For example, a number of armrests is one or more armrests. Locking system 342, however, may not lock number of armrests 344 within armrests 326 in unfolded position 330.

Locking system 342 may be implemented using a remote-controlled actuator and/or some other suitable locking system. For example, Intevia® Intelligent Fastening Mechanisms may be implemented. These types of fastening mechanisms may be available from TZ LIMITED. Shape memory alloys present in Intevia® Intelligent Fastening Mechanisms may be used to lock and unlock number of armrests 344 in these examples.

Sensor 346 may be associated with armrests 326. Sensor 346 may detect whether armrests 326 are in folded position 328 and/or unfolded position 330. Deployment unit 348 may provide a mechanism to automatically change number of armrests 344 between folded position 328 and unfolded position 330. Deployment unit 348 may be, for example, without limitation, a remotely controlled motor that may move number of armrests 344.

In these different advantageous embodiments, seat configuration process 350 may execute on data processing system 352. In particular, seat configuration process 350 may be executed by processor unit 354 in data processing system 352. Processor unit 354 may be a number of processors. These processors may be separate chips in separate packages or may be located on a single chip as a multi-processor. Multiple multi-processors may be present. Further, the processors may be homogeneous or heterogeneous. Data processing system 352 may be located at a crew station, galley, monument, or some other suitable location on, or even off, the aircraft.

Sensor 346 may send position information 356 over wireless connection 358 to data processing system 352. Position information 356 may identify a position of armrests 326. Seat configuration process 350 may identify configuration 360 from passenger information 362. Passenger information 362 may contain information for a passenger associated with first seat 312 and/or second seat 314. Passenger information 362 may include, for example, without limitation, a size of a passenger, a class of service for the passenger, special needs for a passenger, and other suitable passenger information.

Based on passenger information 362, command 364 may be generated by seat configuration process 350 and sent to locking system 342 and/or deployment unit 348. For example, without limitation, command 364 may unlock number of armrests 344. Deployment unit 348 may automatically deploy number of armrests 344 into unfolded position 330.

Further, if other armrests within armrests 326 are in unfolded position 330 other than number of armrests 344, deployment unit 348 may move those armrests into folded position 328. Locking system 342 may lock armrests other than number of armrests 344 in folded position 328. In some advantageous embodiments, the deployment or movement of armrests 326 may be performed by an operator such as, for example, a cabin crew member.

In this manner, seating system 302 may change seating space 366 for seats 304. Specifically, seating space 366 may be changed in the manner as illustrated with respect to first seat 312 and second seat 314.

Row 310 may include additional seats in addition to first seat 312 and second seat 314 in these examples. In this manner, seating space 366 may be changed to take into account different sized passengers. Further, seating space 366 also may be changed to provide different classes of service.

For example, a higher class of service for a passenger may result in a greater seating space for that passenger's assigned seat. With a capability to change seating space 366, passenger cabin 300 may be made more comfortable for passengers based on passenger size, actual usage, class of service, and other passenger information and/or characteristics. Another example is a passenger, who is a frequent flyer, and who may receive additional seat width as a reward. In yet another illustrative example, a traveling family may purchase a row of seats and may configure the width of seats within the row to meet seating needs for adults and/or children in the family.

The illustration of passenger cabin 300 in FIG. 3 is not meant to imply physical or architectural limitations to the manner in which different advantageous embodiments may be implemented. Some advantageous embodiments may have components in addition to and/or in place of the ones illustrated. In other advantageous embodiments, some components illustrated for seating system 302 may be unnecessary. For example, in some advantageous embodiments, only some seats within seats 304 may have armrests 326. In yet other advantageous embodiments, deployment unit 348 may be absent.

With reference now to FIG. 4, a diagram illustrating a passenger cabin is depicted in accordance with an advantageous embodiment. Passenger cabin 400 is an example of one implementation for passenger cabin 300 in FIG. 3. In this illustrative example, passenger cabin 400 may have rows 402, 404, 406, 408, 410, 412, 414, 416, 418, and 420 arranged around aisle 422. In this illustrative example, each of the rows may have armrests that provide a capability to change seating space for the seats within a row.

Figure 5:
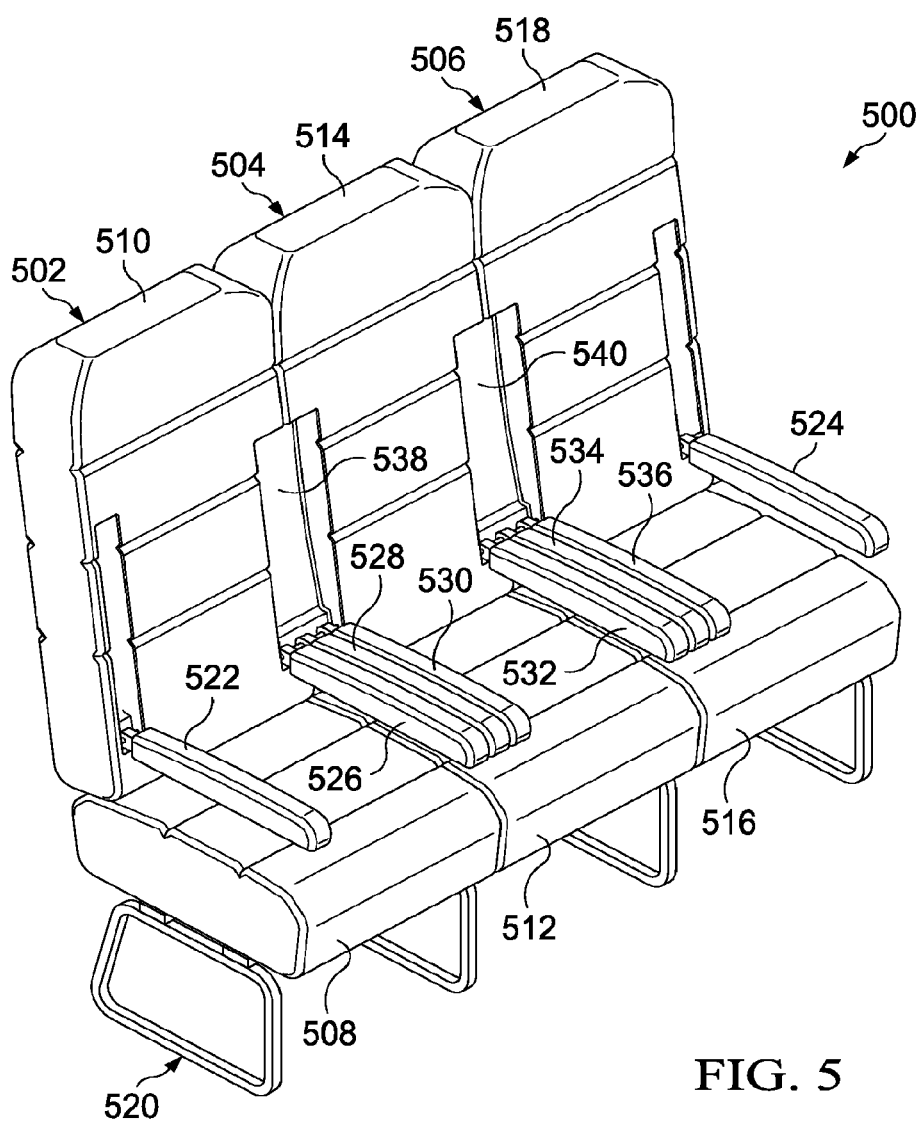
FIG. 5 is a diagram illustrating a row of seats in accordance with an advantageous embodiment.

With reference now to FIG. 5, a diagram illustrating a row of seats is depicted in accordance with an advantageous embodiment. In this example, row 500 is an example of a row of seats in passenger cabin 400 in FIG. 4.

Row 500 may have seats 502, 504, and 506. Seat 502 may have seat base 508 and seat back 510. Seat 504 may have seat base 512 and seat back 514. Seat 506 may have seat base 516 and seat back 518. In some advantageous embodiments, seat base 512 and seat base 516 may be a bench seat. In yet other advantageous embodiments, seat base 508, seat base 512, and seat base 516 all may be part of a bench seat. Thus, a first seat and a second seat may have a common seat base. Seats 502, 504, and 506 may be supported by frame 520. In these advantageous embodiments, armrest 522 and armrest 524 may be fixed or foldable armrests.

In this depicted example, armrests 526, 528, and 530 may be located between seat 502 and seat 504. Armrests 532, 534, and 536 may be located between seat 504 and seat 506. These armrests may fold into space 538 in seat back 510 and seat back 514 and into space 540 in seat back 514 and seat back 518. In this illustrative example, all of the armrests are depicted in a deployed position.

Figure 6:
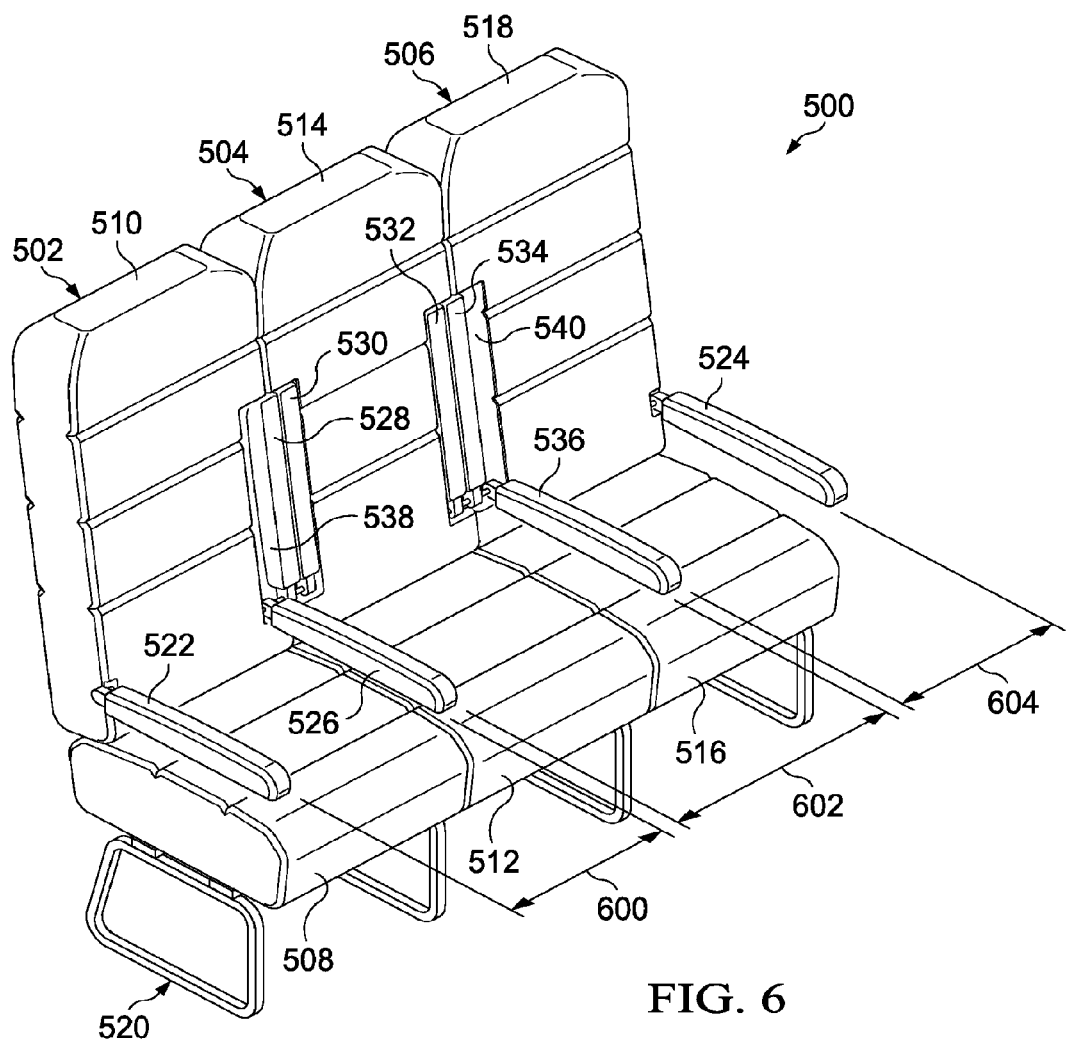
FIG. 6 is a diagram of a row of seats having armrests in different configurations in accordance with an advantageous embodiment.

With reference now to FIG. 6, a diagram of a row of seats having armrests in different configurations is depicted in accordance with an advantageous embodiment. In this example, armrest 526 and armrest 536 may be deployed while armrests 528, 530, 532, and 534 may be in a folded position. In this configuration, seat 502 may have width 600. Seat 504 may have width 602, and seat 506 may have width 604. With this configuration, width 602 may be greater than widths 600 and 604.

A passenger in seat 504 may be provided width 602 to accommodate a passenger size, class of service, or some other suitable passenger criteria. For example, without limitation, a passenger in seat 502 may require less space based on passenger size. As a result, width 600 may be provided to that passenger.

Figure 7:
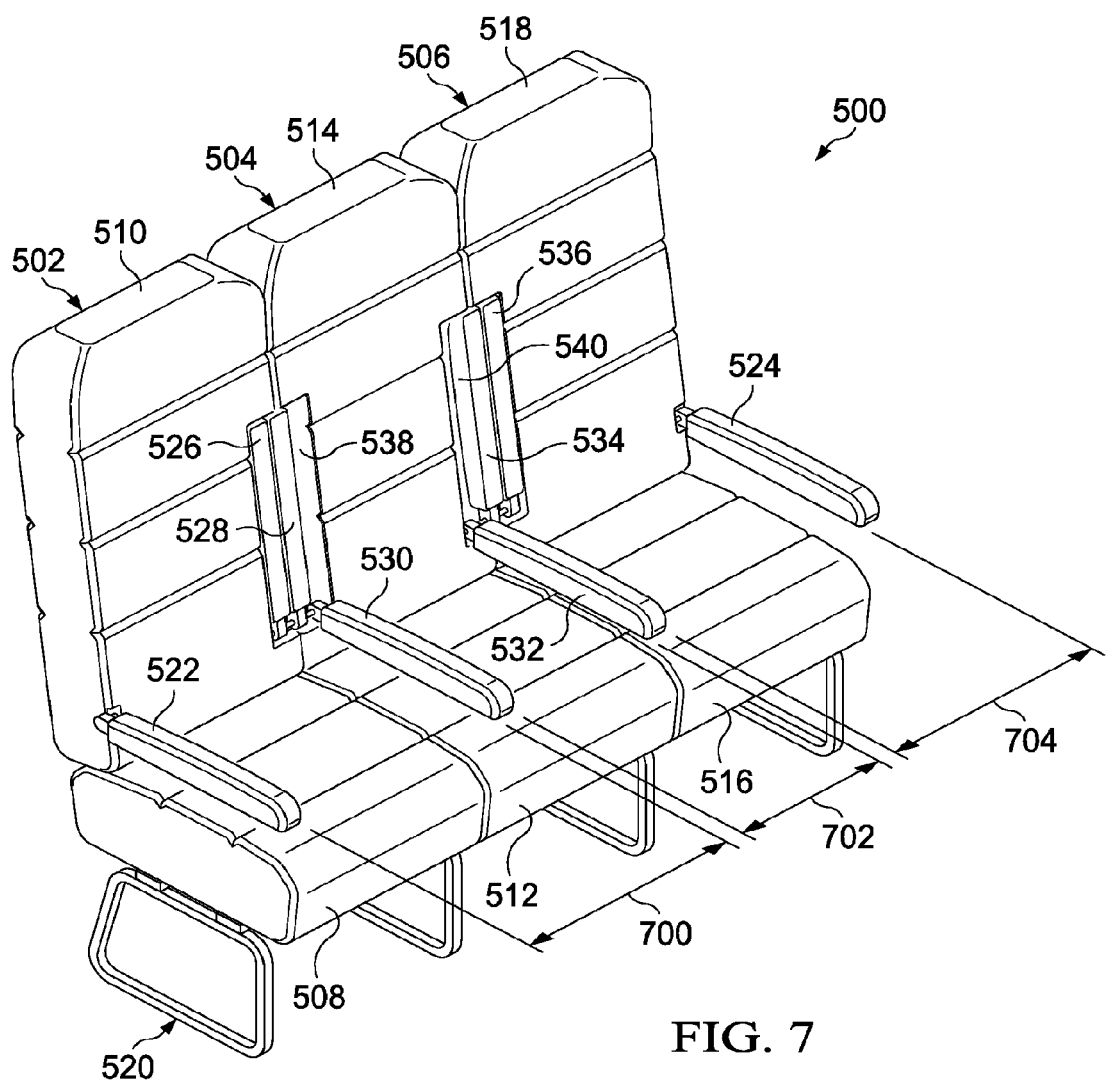
FIG. 7 is a diagram of a row of seats with armrest configurations to change seating space in accordance with an advantageous embodiment.

With reference now to FIG. 7, a diagram of a row of seats with armrest configurations to change seating space is depicted in accordance with an advantageous embodiment. In this example, armrest 530 and armrest 532 may be in an unfolded position, while armrests 526, 528, 534, and 536 may be in a folded position. With this configuration, seat 502 may have width 700, seat 504 may have width 702, and seat 506 may have width 704. With this configuration, width 702 may be smaller than widths 700 and 704.

Figure 8:
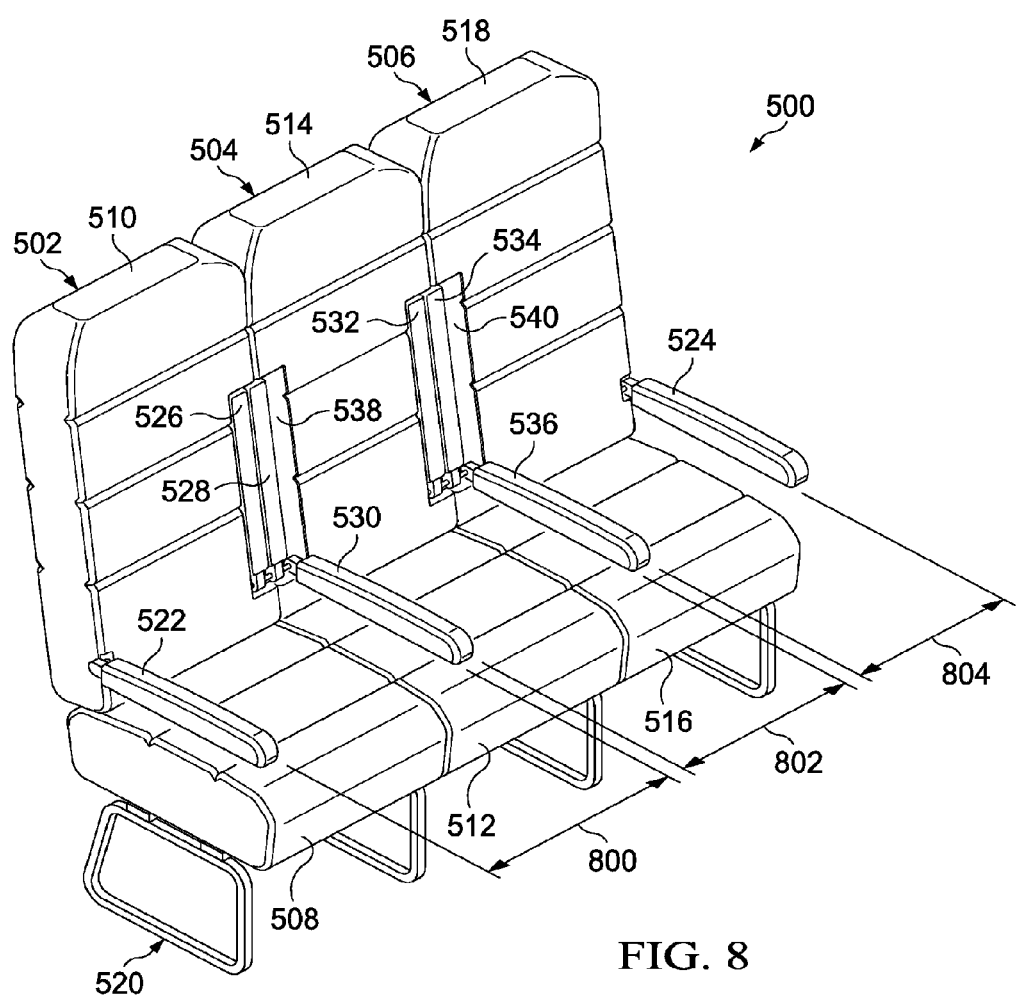
FIG. 8 is a diagram of a row of seats with armrests in different configurations in accordance with an advantageous embodiment.

With reference now to FIG. 8, a diagram of a row of seats with armrests in different configurations is depicted in accordance with an advantageous embodiment. In this example, armrests 530 and 536 may be in an unfolded position while armrests 526, 528, 532, and 534 are in a folded position. This configuration may result in width 800 for seat 502, width 802 for seat 504, and width 804 for seat 506. Width 800 is greater than width 802. Width 802 also may be greater than width 804.

Figure 9:
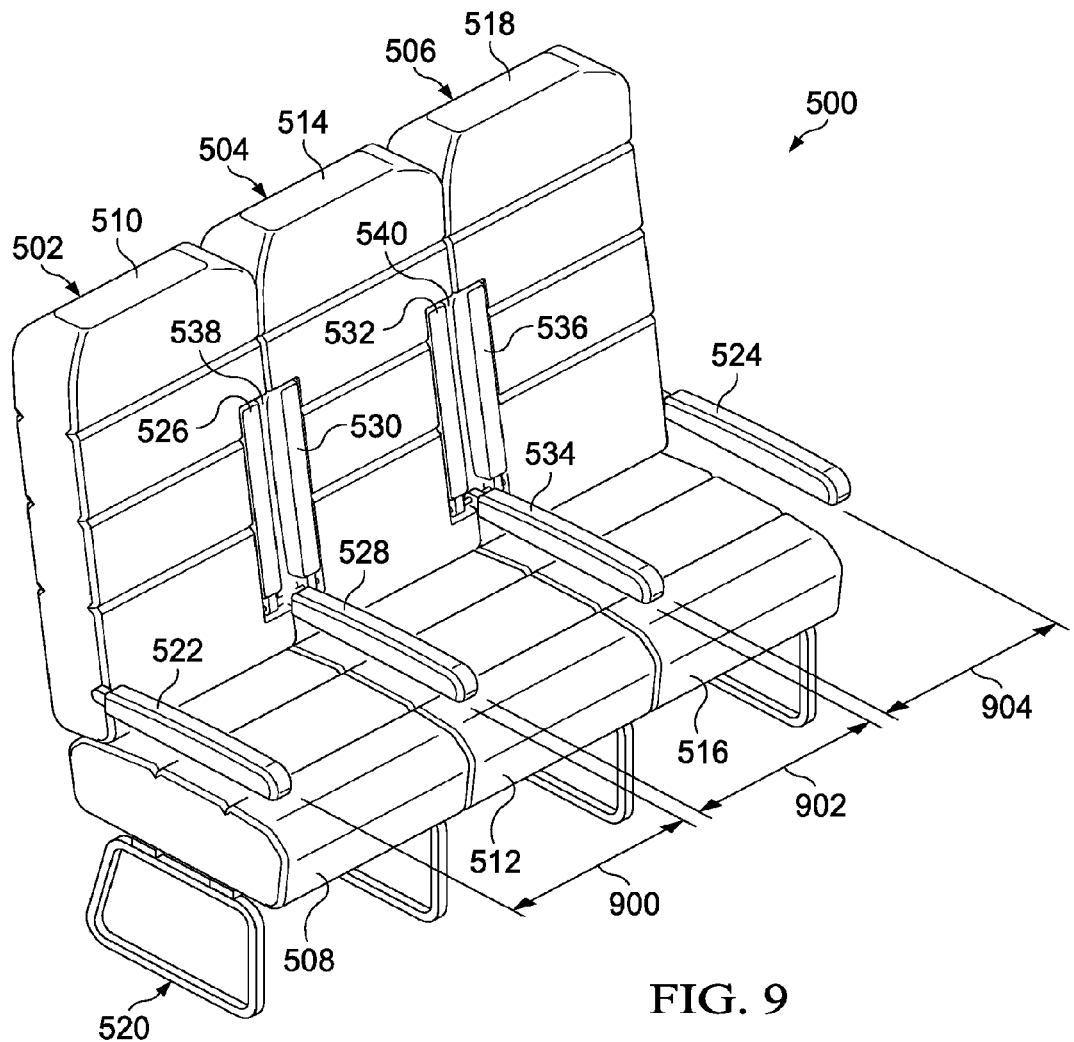
FIG. 9 is a diagram of a row of seats with another armrest configuration in accordance with an advantageous embodiment.

With reference now to FIG. 9, a row of seats with another armrest configuration is depicted in accordance with an advantageous embodiment. In this example, armrests 528 and 534 are in an unfolded position, while armrests 526, 530, 532, and 536 may be in a folded position. With this type of configuration, seat 502 may have width 900, seat 504 may have width 902, and seat 506 may have width 904. In this illustrative example, widths 900, 902, and 904 are all around the same value.

Figure 10:
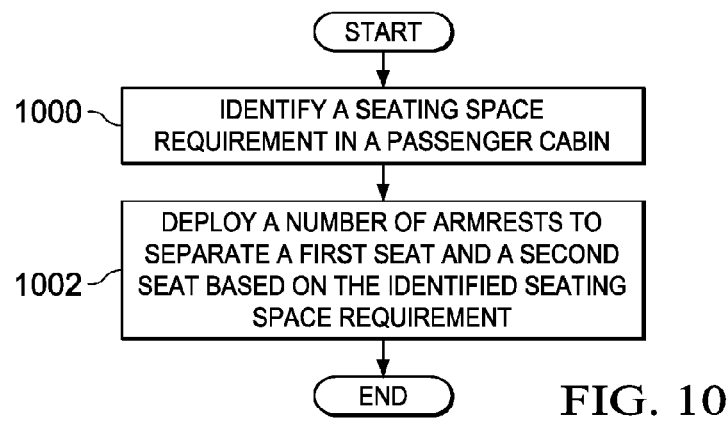
FIG. 10 is a flowchart of a process for allocating seating space in accordance with an advantageous embodiment.

With reference now to FIG. 10, a flowchart of a process for allocating seating space is depicted in accordance with an advantageous embodiment. The process illustrated in FIG. 10 may be implemented using a seating system such as, for example, seating system 302 in FIG. 3.

The process may begin by identifying a seating space requirement in passenger cabin 300 (operation 1000). This seating space requirement may be based on at least one of a size of a passenger assigned to a seat, a class of service for a passenger assigned to a seat, and/or some other suitable requirement.

The process may then deploy a number of armrests 344 separating first seat 312 and second seat 314 based on the identified seating space requirement (operation 1002), with the process terminating thereafter. In these examples, the deployment may include unlocking number of armrests 344 separating first seat 312 and second seat 314 and moving number of armrests 344 into unfolded position 330 from folded position 328. The process then terminates.

The process illustrated in FIG. 10 may be implemented manually by crew members and/or automatically using a data processing system and other associated devices. The particular manner in which seats may be reconfigured by changing armrest positions will depend on the particular implementation.

Figure 11:
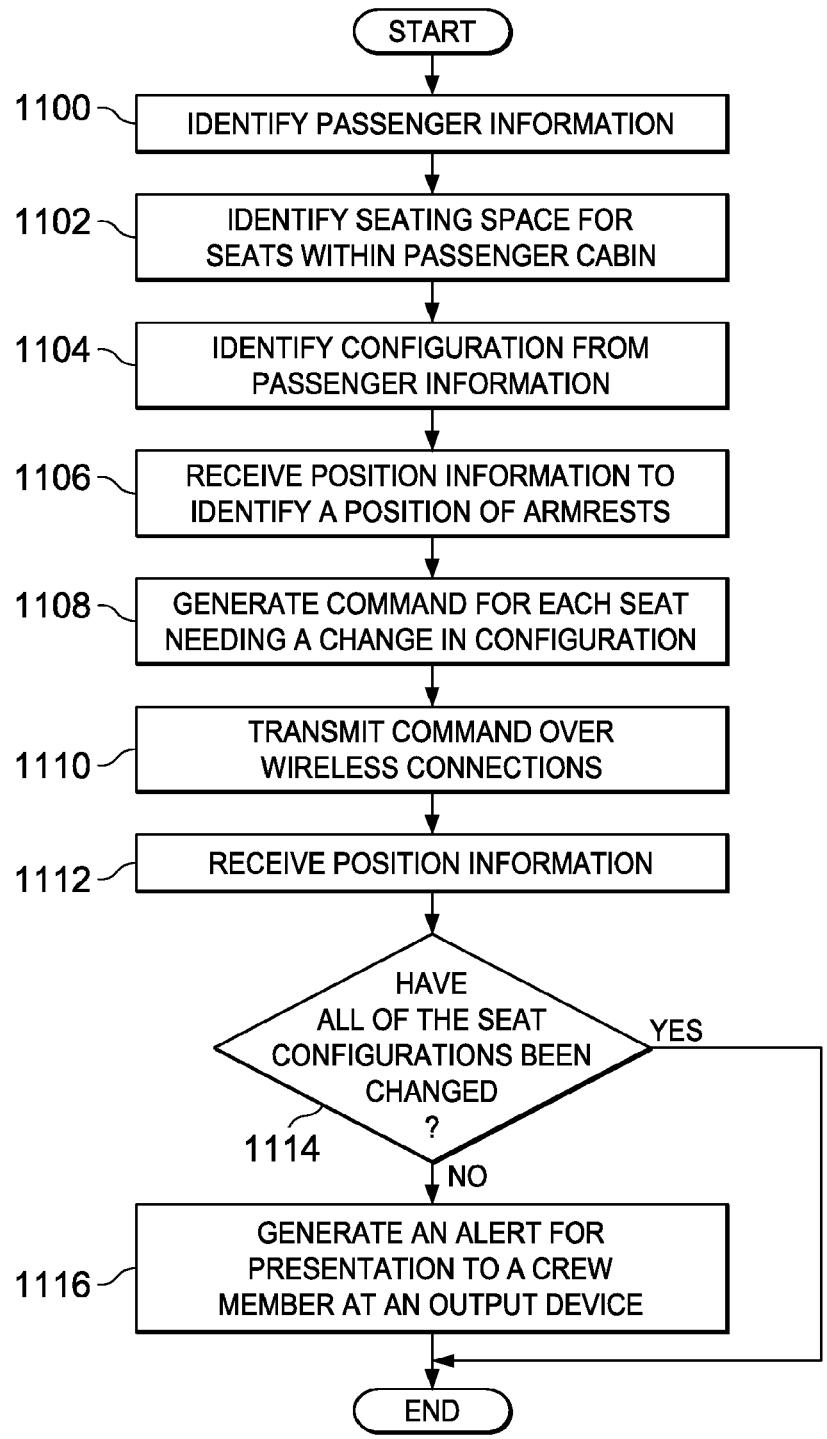
FIG. 11 is a flowchart of a process for configuring armrests for allocating seating space in accordance with an advantageous embodiment.

With reference now to FIG. 11, a flowchart of a process for configuring armrests for allocating seating space is depicted in accordance with an advantageous embodiment. The process illustrated in FIG. 11 may be implemented using a seating system such as, for example, seating system 302 in FIG. 3. This particular example may use a data processing system to control the configuration of seating space for passengers in a passenger cabin. As an example, seat configuration process 350 executing on data processing system 352 in FIG. 3 may implement the processes illustrated in FIG. 11.

Seat configuration process 350 may begin with seat configuration process 350 in data processing system 352 identifying passenger information 362 (operation 1100). This passenger information may be, for example, without limitation, a seating chart identifying seating widths for different passengers. In other advantageous embodiments, passenger information 362 may contain information about passengers such as, for example, passenger size, class of service, and other suitable parameters.

The process may then identify seating space 366 for seats 304 within passenger cabin 300 (operation 1102). Seat configuration process 350 may then identify configuration 360 from passenger information 362 (operation 1104). Configuration 360 may be a position of armrests such as, for example, armrests 326 for first seat 312 and second seat 314. Seat configuration process 350 may then receive position information 356 to identify a position of armrests 326 (operation 1106).

Thereafter, seat configuration process 350 generates command 364 for each seat needing a change in configuration (operation 1108). Seat configuration process 350 transmits command 364 over wireless connection 358 (operation 1110). Command 364 may be received at devices such as, for example, locking system 342 and/or deployment unit 348.

Seat configuration process 350 again receives position information 356 (operation 1112). This information may be used to verify that seat configurations have been changed. A determination is made as to whether all of the seat configurations have been changed (operation 1114).

If all of the seat configurations have been changed, the process may terminate. If all of the seating configurations have not been changed, the process may generate an alert for presentation to a crew member at an output device (operation 1116) with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for reconfiguring seats. The reconfiguration may change a seat width for different seats in a row. The different advantageous embodiments may provide a capability to change seat widths through positioning armrests that may be located between seats. With the different advantageous embodiments, a reconfiguration of seats may be performed without requiring the aircraft to be taken out of service as with current procedures for changing seat widths that involve replacing seats. In the different advantageous embodiments, the seat width may be changed between flights, during flights, or at some other suitable time.

The description of the different advantageous embodiments has been presented for purposes of illustration and description, and it is not intended to be exhaustive or limited to the embodiments in the form disclosed. Many modifications and variations will be apparent to those of ordinary skill in the art. For example, although the different advantageous embodiments depict multiple armrests between seats, multiple armrests also may be used at the ends of seats. For example, multiple armrests may be placed at a side of the seat by an aisle or a side of the seat by a window.

Although the different advantageous embodiments have been described with respect to aircraft, other advantageous embodiments may be applied to other types of objects. For example, without limitation, other advantageous embodiments may be applied to passenger cabins and/or areas in a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a train, a spacecraft, a surface ship, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for allocating seat space, the method comprising:
   identifying a seating space requirement in a passenger cabin to form an identified seating space requirement;
   detecting positions of a plurality of armrests located between a first seat and a second seat and connected to at least one of the first seat and the second seat using a sensor; and
   deploying, using a data processing system, a number of armrests in the plurality of armrests separating the first seat and the second seat based on the identified seating space requirement and the positions of the plurality of armrests.

2. The method of claim 1, wherein the identifying step comprises:
   identifying the seating space requirement for a passenger assigned to the first seat in the passenger cabin to form the identified seating space requirement.

3. The method of claim 1, wherein the identifying step comprises:
   identifying the seating space requirement based on a size of a passenger assigned to the first seat in the passenger cabin to form the identified seating space requirement.

4. The method of claim 1, wherein the identifying step comprises:
   identifying the seating space requirement based on a class of service for a passenger assigned to the first seat in the passenger cabin to form the identified seating space requirement.

5. The method of claim 1, wherein the deploying step comprises:
   unlocking the number of armrests separating the first seat and the second seat based on the identified seating space requirement.

6. The method of claim 1, wherein the deploying step comprises:
   moving the number of armrests into an unfolded position.

7. The method of claim 1, wherein the deploying step comprises:
   unlocking the number of armrests separating the first seat and the second seat based on the identified seating space requirement; and
   moving the number of armrests into an unfolded position.

8. A method for allocating seat space, the method comprising:
   identifying a seating space requirement for a passenger assigned to a first seat in a row in a passenger cabin based on one of a size of the passenger and a class of service to form an identified seating space requirement, the row having a plurality of seats including the first seat, the plurality of seats supported by a frame, and the row having a plurality of armrests between the first seat and a second seat in the plurality of seats and connected to at least one of the first seat and the second seat, in which the first seat is adjacent to the second seat; and
   deploying, using a data processing system, a number of armrests in the plurality of armrests between the first seat and a second seat based on the identified seating space requirement by unlocking the number of armrests based on the identified seating space requirement and moving the number of armrests into an unfolded position to change a seating space for the first seat.

* * * * *